United States Patent [19]
Ito et al.

[11] Patent Number: 4,743,301
[45] Date of Patent: * May 10, 1988

[54] CONCRETE COMPOSITION FOR UNDERWATER USE

[75] Inventors: Koichi Ito; Masaharu Sakuta; Yasuhiko Yoshioka, all of Tokyo; Tadahiro Kaya, Kanagawa; Tsunetoshi Shioya, Kanagawa; Hiroyuki Yamakawa, Kanagawa; Yoshifumi Shimoyama, Kanagawa, all of Japan

[73] Assignees: Takenaka Komuten Co., Ltd., Osaka; Takenaka Doboku Co., Ltd.; Sankyo Chemical Industries, Ltd., both of Tokyo, all of Japan

[*] Notice: The portion of the term of this patent subsequent to Aug. 2, 2002 has been disclaimed.

[21] Appl. No.: 725,116

[22] PCT Filed: Jul. 31, 1984

[86] PCT No.: PCT/JP84/00390
§ 371 Date: Jul. 26, 1985
§ 102(e) Date: Jul. 26, 1985

[87] PCT Pub. No.: WO85/00802
PCT Pub. Date: Feb. 28, 1985

[30] Foreign Application Priority Data

Aug. 18, 1983 [JP] Japan ............... 58-149685
Jul. 11, 1984 [JP] Japan ............... 59-142407
Jul. 11, 1984 [JP] Japan ............... 59-142406

[51] Int. Cl.$^4$ ............................................. C04B 24/16
[52] U.S. Cl. ..................................... 106/90; 106/314; 405/222; 405/224; 405/225; 524/2; 524/3
[58] Field of Search ................. 106/90, 314; 166/293; 524/2, 3; 405/222, 224, 225

[56] References Cited

U.S. PATENT DOCUMENTS

| | | | |
|---|---|---|---|
| 4,015,991 | 4/1977 | Persinski et al. | 106/90 |
| 4,487,633 | 12/1984 | Sakuta et al. | 106/90 |
| 4,500,357 | 2/1985 | Brothers et al. | 106/90 |
| 4,508,572 | 4/1985 | Sakuta et al. | 106/90 |
| 4,515,635 | 5/1985 | Rao et al. | 106/314 |

FOREIGN PATENT DOCUMENTS

| | | |
|---|---|---|
| 58-190851 | 11/1983 | Japan . |
| 59-20956 | 2/1984 | Japan . |
| 59-54656 | 3/1984 | Japan . |
| 8500802 | 2/1985 | World Int. Prop. O. . |

Primary Examiner—Steven Capella
Attorney, Agent, or Firm—Lowe, Price, Leblanc, Becker & Shur

[57] ABSTRACT

A concrete composition for underwater use contains about 0.1 to 4% by weight based on cement content of a water soluble vinyl polymer containing vinyl units having sulfonic groups. The concrete composition is easy to mix and prevents separation of concrete composition constituents as it is laid under water.

8 Claims, No Drawings

CONCRETE COMPOSITION FOR UNDERWATER USE

TECHNICAL FIELD

The present invention relates to a concrete composition for underwater use. More specifically, the present invention relates to an underwater concrete which is easy to mix and which contains an admixture for preventing separation of concrete composition constituents when concrete is laid under water.

The concrete composition according to the present invention includes mortar consisting of cement and sand, and concrete consisting of cement, sand, coarse aggregate and water.

BACKGROUND ART

As concrete is being laid under water, the cement paste portion is washed away from a part of the concrete mix upon contact with water and the concrete has a nonuniform composition, either as the concrete mix is falling through the water or as the concrete mix is spreading in a lateral direction. As a result, the strength of the concrete mix is reduced, and the separated cement paste is diffused into the surrounding water rendering it turbid. In order to resolve these problems, in a structural material mixture for underwater structures, there is disclosed a technique of adding to concrete a cellulose derivative or polyacrylamide, i.e., an acrylamide homopolymer as an admixture (DE-O-No. 2541747). However, when such an admixture is used, the obtained concrete mix has a delayed setting time and a lower strength, particularly initially, than a concrete mix containing no such agent.

A concrete containing a polyacrylamide partial hydrolysate compound as disclosed in Japanese Patent Disclosure No. 59-54656 has excellent characteristics as an underwater concrete in that it does not have a delayed setting time or a low initial strength. However, this polymer compound has a strong cohesive force with respect to cement as in the case of an acrylamide homopolymer. Therefore, the concrete mix tends to harden and is difficult to mix. When mixing of the concrete mix is difficult, mixing to obtain a uniform composition is time-consuming. In addition, the load on a mixer is increased, resulting in an impractical concrete composition.

A conventional method for adding a water soluble vinyl polymer to a cement composition is known. For example, U.S. Pat. No. 4015991 discloses as a water soluble vinyl polymer a hydrolysate of a copolymer containing 2-acrylamido-2-methylpropane-sulfonic acid units. U.S. Pat. No. 4340525 discloses a copolymer containing vinyl sulfonic acid units as a water soluble vinyl polymer. However, such water soluble vinyl polymers are used in a cementing technique to prevent water in the cement composition from being absorbed in a porous stratum. Therefore, even if such a water soluble vinyl polymer is used in a technique for laying concrete under water, the separation amount of cement continues to be large and setting time of the concrete is still delayed. Therefore, when such a water soluble vinyl polymer is used in underwater concrete, the concrete mix cannot be prevented from deteriorating under water. Furthermore, since the strength of the concrete mix is also considerably reduced, a water soluble vinyl polymer cannot be used as an underwater concrete admixture.

DISCLOSURE OF INVENTION

The present inventors have made extensive studies to resolve these problems. As a result of these studies, it was found that a concrete composition containing 0.1 to 4% by weight of a water soluble polymer based on the weight of cement and containing units represented by a general formula (I):

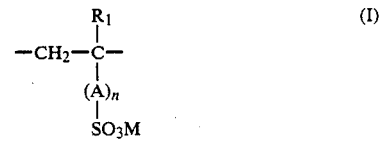

[wherein $R_1$ is a hydrogen atom or a lower alkyl group, A is $-CH_2-$, $-CONHCH_2-$,

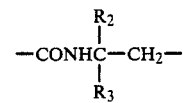

(wherein $R_2$ and $R_3$ are a hydrogen atom or a lower alkyl group and can be the same or different), or

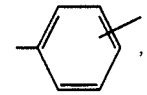

n is 0 or an integer of 1, and M is a hydrogen atom, alkali metal or ammonium]; or
0.1 to 4% by weight of a water soluble polymer based on the weight of cement and containing vinyl units represented by the general formula (I) and having sulfonic groups, and containing vinyl units other than vinyl units having sulfonic groups and represented by a general formula (II):

[wherein $R_4$ is a hydrogen atom or a lower alkyl group, X is $-CONH_2$, $-COOR^5$ (wherein $R^5$ is a lower alkyl group or a lower hydroxyalkyl group) or

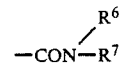

(wherein $R^6$ and $R^7$ are the same or different lower alkyl group or such that when one is a hydrogen atom the other is a lower alkyl group; $R^6$ and $R^7$ can form 5- or 6-member rings together with nitrogen atoms bonded thereto with or without oxygen atoms)] is free from the problems associated with the conventional concrete composition and has desirable characteristics. It is, therefore, an object of the present invention to provide an underwater concrete composition which does not separate under water, has no setting time delay or a decrease in strength, and allows easy mixing.

Examples of a vinyl monomer containing sulfonic groups and having the general formula (I) may include 2-acrylamidoethane-sulfonic acid, 2-acrylamidopropanesulfonic acid, 2-acrylamido-2-methylpropane-sulfonic acid, 2-methacrylamidoethanesulfonic acid, 2-methylacrylamidopropanesulfonic acid, 2-methacrylamido-2-methylpropanesulfonic acid, acrylamidomethanesulfonic acid, methacrylamidomethanesulfonic acid, vinylsulfonic acid, styrenesulfonic acid, or alkali metal salts or ammonium salts thereof.

Examples of a vinyl monomer having the general formula (II) may include acrylamide, methacrylamide, N,N-dimethylacrylamide, N,N-diethylacrylamide, N-acryloylpiperidine, N-acryloylmorpholine, N,N-dimethylmethacrylamide, N,N-diethylmethacrylamide, N-methacryloylpiperidine, N-methacryloylmorpholine, N-methylacrylamide, N-ethylacrylamide, N-propylacrylamide, N-methylmethacrylamide, N-ethylmethacrylamide, N-propylmethacrylamide, methyl acrylate, ethyl acrylate, hydroxyethyl acrylate, methyl methacrylate, ethyl methacrylate, and hydroxyethyl methacrylate.

A water soluble vinyl polymer compound to be used herein is prepared by polymerizing a vinyl monomer represented by the general formula (I) by a known method or by polymerizing a vinyl monomer represented by the general formula (I) and a vinyl monomer represented by the general formula (II) by a known method. Polymerization is preferably performed in an aqueous medium using a radial polymerization initiator such as a peroxide or an organic azo compound. The polymer can have a molecular weight of 1,000,000 to about 20,000,000 although it varies depending upon the type and amount of the polymerization initiator used. When the polymerization reaction is performed in an aqueous medium, the water soluble vinyl polymer compound obtained may contain carboxyl groups. Therefore, the polymerization reaction is preferably performed in a neutral liquid or at a low temperature.

In a water soluble vinyl polymer compound used herein, when the copolymerization ratio of the vinyl monomer represented by the general formula (I) is increased, mixing of the concrete composition of the present invention is rendered easier. However, if this copolymerization ratio is too high, the water-inseparable property and compressive strength of the concrete composition are decreased, resulting in a disadvantage. Therefore, the molar ratio of the acryl monomer represented by the general formula (I) to be subjected to the polymerization reaction must be 3% or more and preferably 3 to 95%.

A water soluble vinyl polymer compound to be used herein must have a high molecular weight to impart the water-inseparable property to the concrete composition. Thus, the molecular weight of the water soluble vinyl polymer is preferably 1,000,000 or more. The water soluble vinyl polymer must be added at least in an amount of 0.1% by weight based on the cement content of the concrete composition. When the amount of the water soluble vinyl polymer exceeds about 4% by weight, it is uneconomical and also results in a viscous material which is hard to handle and has a low compressive strength.

When a water soluble vinyl polymer compound is added to the concrete composition of the present invention, it can be added to the cement in advance, it can be added to the ready mixed concrete, or it can be dissolved and then added to the ready mixed concrete. At this time, a proper amount of a concrete dispersant such as a sulfonic acid derivative, e.g., melamine sulfonic acid-formaldehyde condensate, naphthalinesulfonic acid-formaldehyde condensate or lignin sulfonate can be added to further improve concrete flow characteristics.

BEST MODE OF CARRYING OUT THE INVENTION

Example 1

A vinyl monomer represented by the general formula (I) and a vinyl monomer represented by the general formula (II) were polymerized to prepare a water soluble acryl polymer having a molecular weight of about 7,000,000. One % by weight of the polymer compound was added to a concrete mix of the constituent proportions as illustrated in Table 1 below based on the cement content thereof. The resultant mixture was mixed with a uniaxial forced mixer having a volume of 50 l. The mixed state was observed, and the mixture was subjected to the falling through water test and the compressive strength test.

TABLE 1

| Unit amounts (kg/m³) | | | | Water-cement ratio (%) | Sand-aggregate ratio (%) | Air content (%) |
|---|---|---|---|---|---|---|
| Water | Cement | Fine aggregate | Coarse aggregate | | | |
| 235 | 440 | 643 | 979 | 53 | 40 | 1 |

According to the falling through water test, a specimen concrete mix was poured into a truncated container having a lower diameter of 5 cm, an upper diameter of 7 cm and a depth of 8 cm. The test was conducted by placing the test container with the specimen concrete mix at a height of 10 cm above the water surface in a cylindrical container having a diameter of 20 cm and a height of 26 cm and containing water therein to a depth of 16 cm, and then pouring the specimen concrete mix so as to let it fall by gravity into the water. The test results were obtained by measuring a turbidity of the water by transmittance at a wavelength of 660 μm with a photoelectric photometer. A higher transmittance means a smaller amount of cement component which has been separated from the concrete and diffused into the water, and hence, smaller deterioration of the concrete quality.

Specimens for the compressive strength test were prepared by forming the concrete mix into the form of a cylinder having a diameter of 15 cm and a height of 30 cm and then curing it in water at 20° C. The tests were carried out on the 7th and 28th day.

The mixing state of the concrete mix is indicated by the following three levels.

A: Within 2 minutes after starting mixing of the concrete mix, a uniform mix with flowability is obtained. The mix has a desired slump value and is well mixed.

B: After mixing is started, the mix becomes temporarily hard. Within 7 minutes, the mix achieves a uniform state having flowability and a desired slump value.

C: After mixing is started, the concrete mix coheres firmly and mixing is rendered difficult to perform. In order to obtain a uniform state with flowability, a mixing time of longer than 7 minutes is required.

For the purpose of comparison, a similar test was performed for a concrete mix (plain concrete) which did not contain a water soluble vinyl polymer compound and for concrete mixes which contained 1% by weight of polyacrylamide (molecular weight: 7,000,000) and a polyacrylamide partial hydrolysate compound (molecular weight: 7,000,000), respectively, based on the weight of the cement content.

The obtained results are shown in Table 2 below.

TABLE 2

| Water soluble vinyl polymer compound | Mixing state | Trans-mittance (%) | Slump (cm) | Compressive strength (kg/cm$^2$) 7th day | 28th day |
|---|---|---|---|---|---|
| Example | | | | | |
| Sodium 2-acrylamido-2-methylpropanesulfonate-acrylamide copolymer (10:90% mole) | A | 99 | 21 | 257 | 370 |
| Sodium 2-acrylamido-ethanesulfonateacrylamide copolymer (10:90% mole) | A | 98 | 21.5 | 253 | 361 |
| Sodium 2-acrylamido-2-methyl-propanesulfonate-methacrylamide copolymer (10:90% mole) | A | 98 | 21 | 255 | 364 |
| Sodium 2-acrylamido-2-methyl-propanesulfonate-N,N—dimethyl-acrylamide copolymer (10:90% mole) | A | 100 | 21.5 | 261 | 378 |
| Comparative Example | | | | | |
| Polyacrylamide | C | 89 | 19–20 | 140 | 280 |
| Polyacrylamide partial hydrolysate compound (6% mole hydrolysis degree) | B | 89 | 21.5 | 257 | 365 |
| No admixture | A | 3 | 22 | 257 | 358 |

Example 2

A similar test to that in Example 1 was performed for concrete mixes containing 1% by weight, based on the cement content, of water soluble vinyl copolymers of solium 2-acrylamido-2-methylpropane sulfonate and acrylamide having different polymerization molar ratios and different molecular weights.

The obtained results are shown in Table 3 below.

TABLE 3

| Sodium 2-acrylamido-2-methylpropanesulfonate/acrylamide (molar ratio) | Molecular weight (× 10,000) | Mixing state | Trans-mittance (%) | Slump (cm) | Compressive strength (kg/cm$^2$) 7th day | 28th day |
|---|---|---|---|---|---|---|
| Example | | | | | | |
| 3/97 | 100 | A | 75 | 21.5 | 256 | 375 |
| | 300 | A | 90 | 21 | 264 | 370 |
| | 700 | A | 100 | 21 | 258 | 375 |
| 10/90 | 100 | A | 77 | 21 | 257 | 366 |
| | 300 | A | 89 | 21 | 261 | 371 |
| | 700 | A | 99 | 21 | 257 | 370 |
| 20/80 | 100 | A | 75 | 24 | 256 | 374 |
| | 300 | A | 88 | 23.5 | 261 | 377 |
| | 700 | A | 99 | 23.5 | 260 | 382 |
| 50/50 | 100 | A | 74 | 24 | 260 | 378 |
| | 300 | A | 88 | 24 | 263 | 370 |
| | 700 | A | 98 | 23.5 | 262 | 382 |
| 85/15 | 100 | A | 70 | 24 | 255 | 368 |
| | 300 | A | 87 | 24 | 259 | 374 |
| | 700 | A | 98 | 24 | 258 | 379 |
| Comparative Example | | | | | | |
| 1/99 | 100 | B | 76 | 21 | 259 | 360 |
| | 300 | B | 90 | 20 | 260 | 370 |
| | 700 | B | 100 | 20 | 262 | 378 |

Example 3

A similar test to that in Example 1 was performed for concrete mixes which were obtained by adding a water soluble vinyl polymer compound of sodium 2-acrylamido-2-methylpropanesulfonate and acrylamide having a polymerization molar ratio of 10:90 and having a molecular weight of 7,000,000 to the concrete shown in Table 1. Table 4 below shows the obtained results in relation to the amount of the compound added.

TABLE 4

| Addition amount (% by weight based on cement content) | Mixing state | Trans-mittance (%) | Slump (cm) | Compressive strength (kg/cm$^2$) 7th day | 28th day |
|---|---|---|---|---|---|
| Example | | | | | |
| 0.1 | A | 89 | 19 | 255 | 368 |
| 0.5 | A | 93 | 22 | 254 | 370 |
| 1.0 | A | 99 | 21 | 257 | 370 |
| 2.0 | A | 100 | 21 | 252 | 367 |
| 4.0 | A | 100 | 21 | 232 | 355 |
| Comparative Example | | | | | |
| 0.05 | B | 60 | 12 | 242 | 350 |

Example 4

One % by weight of a water soluble vinyl polymer compound having a molecular weight of 7,000,000 used in Example 1 was added to the mortar in Table 5 based on its cement content. The resulting mixture was mixed with a mortar mixer having a volume of 3 l. The mixed mortar was subjected to the flow test, the falling through water test and the compressive strength test.

TABLE 5

| Unit amounts (kg/m$^3$) | | | Water-cement ratio (%) | Sand-cement ratio (%) |
|---|---|---|---|---|
| Water | Cement | Sand | | |
| 338 | 520 | 1040 | 65 | 200 |

The flow test was performed in accordance with JIS (Japanese Industrial Standards) R5201.

According to the falling through water test, a specimen mortar was poured into a cylindrical container having a diameter of 5 cm and a depth of 5 cm. The test was conducted by placing the test container with the specimen mortar at a height of 10 cm above the water surface in a graduated measuring cylinder containing 1 l of water. The test results were obtained by measuring a turbidity of the water by transmittance at a wavelength of 660 μm with a photoelectric photometer. A higher transmittance means a smaller amount of cement component which has been separated from the mortar and diffused into the water, and hence, smaller deterioration of the mortar quality.

Specimens for the compressive strength test were prepared by forming the mortar into the form of a square rod having a section of 4×4 cm and a length of 16 cm and then curing it in water at 20° C. The test was carried out on the 7th and 28th day.

The mixing state of the mortar was indicated in the same manner as in Example 1.

For the purpose of comparison, a similar test was performed for mortar which contained 1% by weight of polyacrylamide (molecular weight: 7,000,000) based on the cement content. The obtained results are shown in Table 6.

TABLE 6

| Water soluble vinyl polymer compound | Mixing state | Transmittance (%) | Flow (cm) | Compressive strength (kg/cm$^2$) 7th day | 28th day |
|---|---|---|---|---|---|
| Example | | | | | |
| Sodium 2-acryl-amido-2-methyl-propanesulfonate-acrylamide copolymer (10:90% mole) | A | 98 | 18 | 260 | 310 |
| Comparative Example | | | | | |
| Polyacrylamide | C | 92 | 15 | 190 | 250 |

We claim:

1. A concrete composition for underwater use consisting essentially of cement, aggregate, water and about 0.1 to 4% by weight, based on the weight of the cement, of a water soluble vinyl polymer containing vinyl units represented by the formula I:

$$-CH_2-\underset{\underset{SO_3M}{\underset{|}{(A)_n}}}{\overset{\overset{R^1}{|}}{C}}- \qquad (I)$$

wherein R$^1$ is a hydrogen atom or a lower alkyl group, A is —CH$_2$—, —CONHCH$_2$—,

wherein R$^2$ and R$^3$ are a hydrogen atom or a lower alkyl group and can be the same or different, or

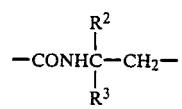

n is 0 or an integer of 1, and M is a hydrogen atom, alkali metal or ammonium, and containing units represented by the formula II:

$$-CH_2-\underset{\underset{X}{|}}{\overset{\overset{R_4}{|}}{C}}- \qquad (II)$$

wherein R$_4$ is a hydrogen atom or a lower alkyl group, X is CONH$_2$, COOR$_5$ wherein R$_5$ is a lower alkyl group or a lower hydroxyalkyl group, or

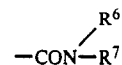

wherein R$^6$ and R$^7$ are the same or different lower alkyl group or one of R$^6$ and R$^7$ is a hydrogen atom and the other is a lower alkyl group, or R$^6$ and R$^7$ form 5- or 6-member rings together with nitrogen atoms bonded thereto, with or without oxygen atoms.

2. A concrete composition for underwater use according to claim 1, wherein the water soluble vinyl polymer containing vinyl units having sulfonic groups is a water soluble acryl polymer compound obtained by polymerizing an acryl monomer represented by a general formula (III):

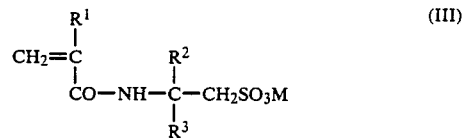

(wherein R$^1$, R$^2$ and R$^3$ are a hydrogen atom or a lower alkyl group and can be the same or different, and M is a hydrogen atom, an alkali metal or ammonium) with an acryl monomer represented by a general formula (IV):

(wherein R$^4$ is a hydrogen atom or a lower alkyl group).

3. A concrete composition for underwater use according to claim 2, wherein the water soluble acryl polymer compound is a water soluble acryl polymer compound having a molecular weight of not less than 1,000,000 and obtained by polymerizing 3 to 95% moles of an acryl monomer represented by the general formula (III) with 97 to 5% moles of an acryl monomer represented by the general formula (IV).

4. A concrete composition for underwater use as defined by claim 1 containing 0.1 to 4% by weight based on the weight of the cement of a water soluble acryl polymer compound having a molecular weight of not less than 1,000,000 and obtained by polymerizing 3 to 95% moles of sodium 2-acrylamido-2-methylpropanesulfonate with 97 to 5% moles of a acrylamide.

5. A concrete composition for underwater use as defined by claim 1 containing 0.1 to 4% by weight based on the weight of the cement of a water soluble acryl polymer compound having a molecular weight of not less than 1,000,000 and obtained by polymerizing 3 to 95% moles of sodium 2-acrylamido-2-methylpropanesulfonate with 97 to 5% moles of N,N-dimethylacrylamide.

6. A concrete composition for underwater use consisting essentially of cement, aggregate, water and about 0.1 to 4% by weight, based on the weight of the cement, of a water soluble acryl polymer obtained by polymerizing an acryl monomer represented by a general formula (III):

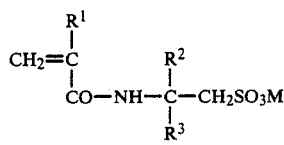

wherein $R^1$, $R^2$ and $R^3$ are a hydrogen atom or a lower alkyl group and can be the same or different, and M is a hydrogen atom, an alkali metal or ammonium, with an acryl monomer represented by a general formula (V):

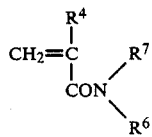

wherein $R^4$ is a hydrogen atom or a lower alkyl group, and $R^6$ and $R^7$ are the same or different lower alkyl group, or one is a hydrogen atom and the other is a lower alkyl group, or $R^6$ and $R^7$ form 5- or 6-member rings together with nitrogen atoms bonded thereto, with or without oxygen atoms.

7. A concrete composition for underwater use according to claim 6, wherein the water soluble acryl polymer compound is a water soluble acryl polymer compound having a molecular weight of not less than 1,000,000 and obtained by polymerizing an acryl monomer represented by the general formula (III) with an acryl monomer represented by the general formula (V).

8. A method for laying concrete underwater comprising laying a concrete composition for underwater use consisting essentially of cement, aggregate, water and about 0.1 to 4% by weight, based on the weight of the cement, of a water soluble vinyl polymer containing vinyl units represented by the formula I:

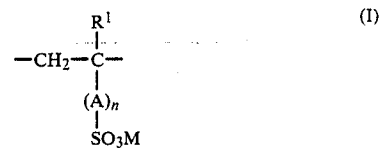

wherein $R^1$ is a hydrogen atom or a lower alkyl group, A is $-CH_2-$, $-CONHCH_2-$,

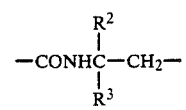

wherein $R^2$ and $R^3$ are a hydrogen atom or a lower alkyl group and can be the same or different, or

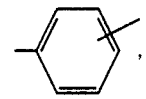

n is 0 or an integer of 1, and M is a hydrogen atom, alkali metal or ammonium, and containing units represented by the formula II:

wherein $R_4$ is a hydrogen atom or a lower alkyl group, X is $CONH_2$, $COOR_5$ wherein $R_5$ is a lower alkyl group or a lower hydroxyalkyl group, or

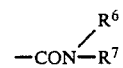

wherein $R^6$ and $R^7$ are the same or different lower alkyl group or one of $R^6$ and $R^7$ is a hydrogen atom and the other is a lower alkyl group, or $R^6$ and $R^7$ form 5- or 6-member rings together with nitrogen atoms bonded thereto, with or without oxygen atoms.

* * * * *

UNITED STATES PATENT AND TRADEMARK OFFICE
CERTIFICATE OF CORRECTION

PATENT NO. : 4,743,301
DATED : May 10, 1988
INVENTOR(S) : Ito et al

It is certified that error appears in the above-identified patent and that said Letters Patent is hereby corrected as shown below:

On the title page

Please add the following names to the list of inventors:

-- Soichi Kiya
Iwao Uchizaki
both of Tokyo, Japan --

Signed and Sealed this

Twentieth Day of December, 1988

*Attest:*

DONALD J. QUIGG

*Attesting Officer*    *Commissioner of Patents and Trademarks*